US011533293B2

(12) United States Patent
Tirumala et al.

(10) Patent No.: US 11,533,293 B2
(45) Date of Patent: Dec. 20, 2022

(54) SCORING DOMAINS AND IPS USING DOMAIN RESOLUTION DATA TO IDENTIFY MALICIOUS DOMAINS AND IPS

(71) Applicant: AT&T Intellectual Property I, L.P., Atlanta, GA (US)

(72) Inventors: Swapna Buccapatnam Tirumala, Holmdel, NJ (US); Fei Wu, Jersey City, NJ (US); Carolyn Roche Johnson, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 139 days.

(21) Appl. No.: 16/791,135

(22) Filed: Feb. 14, 2020

(65) Prior Publication Data
US 2021/0266292 A1 Aug. 26, 2021

(51) Int. Cl.
*H04L 29/06* (2006.01)
*H04L 12/24* (2006.01)
(Continued)

(52) U.S. Cl.
CPC .......... *H04L 63/0236* (2013.01); *H04L 41/22* (2013.01); *H04L 63/1416* (2013.01);
(Continued)

(58) Field of Classification Search
CPC . H04L 63/0236; H04L 63/1475; H04L 41/22; H04L 63/1425; H04L 63/1433; H04L 63/1416
See application file for complete search history.

(56) References Cited

U.S. PATENT DOCUMENTS 9,762,612 B1 * 9/2017 Schiffman ........... H04L 61/1511
10,291,645 B1 * 5/2019 Frantzen ............... G06F 21/554
(Continued)

FOREIGN PATENT DOCUMENTS

WO WO-2017086992 A1 * 5/2017

OTHER PUBLICATIONS

Manadhata P.K., Yadav S., Rao P., Horne W. (2014) Detecting Malicious Domains via Graph Inference. In: Kutyłowski M., Vaidya J . (eds) Computer Security—ESORICS 2014. ESORICS 2014. Lecture Notes in Computer Science, vol. 8712. Springer, Cham. https://doi.org/10.1007/978-3-319-11203-9_1 (18 pages) (Year: 2014).*

(Continued)

*Primary Examiner* — Joseph P Hirl
*Assistant Examiner* — Thomas A Gyorfi
(74) *Attorney, Agent, or Firm* — Guntin & Gust, PLC; Mark Wilinski

(57) ABSTRACT

Domains and IPs are scored using domain resolution data to identify malicious domains and IPs. A domain and IP resolution graph for a set of domains and IPs in a system. A seed set of known malicious domains and known malicious IPs is selected from a malicious domain and malicious IP database. A graphical probabilistic propagation inference from the domain and IP resolution graph and the seed set of known malicious domains and known malicious IPs is generated. A malicious score is calculated for each domain in the set of domains and each IP in the set of IPs, and the malicious domain and malicious IP database is updated.

20 Claims, 11 Drawing Sheets

(51) Int. Cl.
*H04L 9/40* (2022.01)
*H04L 41/22* (2022.01)

(52) U.S. Cl.
CPC ...... *H04L 63/1425* (2013.01); *H04L 63/1433* (2013.01); *H04L 63/1475* (2013.01)

(56) References Cited

U.S. PATENT DOCUMENTS

| | | | | |
|---|---|---|---|---|
| 10,440,059 | B1* | 10/2019 | McCarty | H04L 63/1433 |
| 2014/0201836 | A1* | 7/2014 | Amsler | H04L 63/20 |
| | | | | 726/23 |
| 2018/0027009 | A1* | 1/2018 | Santos | H04L 63/1433 |
| | | | | 726/25 |
| 2018/0131708 | A1* | 5/2018 | Pirttilahti | H04L 61/4511 |
| 2020/0304540 | A1* | 9/2020 | Chang | H04L 63/1483 |

OTHER PUBLICATIONS

H. Tran, A. Nguyen, P. Vo and T. Vu, "DNS graph mining for malicious domain detection," 2017 IEEE International Conference on Big Data (Big Data), 2017, pp. 4680-4685, doi: 10.1109/BigData.2017.8258515. (Year: 2017).*

* cited by examiner

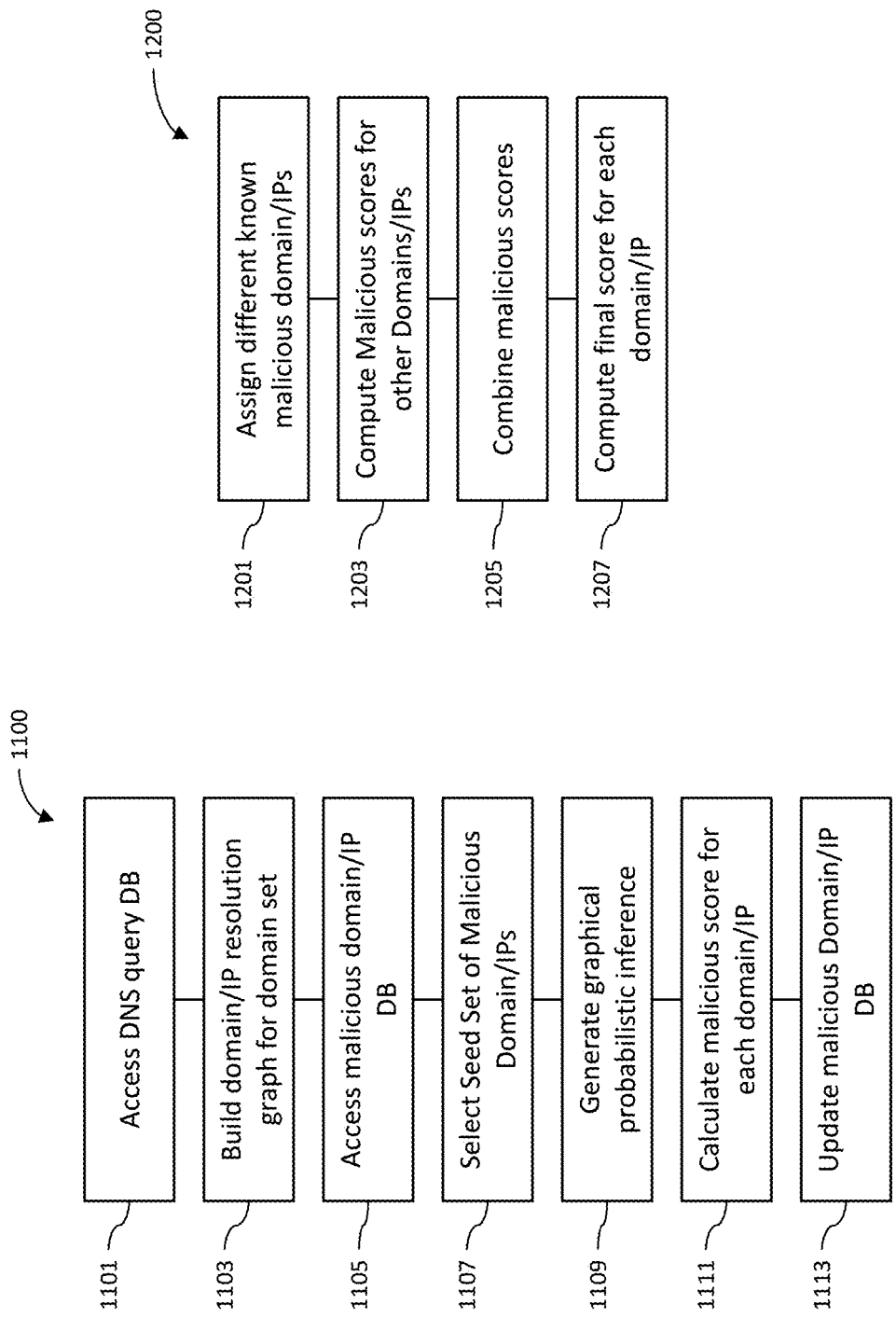

SCORING DOMAINS AND IPS USING DOMAIN RESOLUTION DATA TO IDENTIFY MALICIOUS DOMAINS AND IPS

TECHNICAL FIELD

The present disclosure relates to the identification of malicious domains and IPs in networks. More particularly, the disclosure relates to a method, system, and computer program for scoring domains and IPs using domain resolution data to identify malicious domains and IPs.

BACKGROUND

Internet Protocol (IP) addresses are used to access resources in a network. For example, domain names are assigned to computing servers and clients. An Internet Protocol address (IP address) is a numerical label given to each device connected to networks that uses the Internet Protocol for communication. An IP address serves two main functions. The first is to is identify the host or more specifically its network interface. The second function is to allocate a unique address to a device on a network so that any information sent to that device can reach it by referring to its address.

A domain name system (DNS) is a naming database storing internet domain names that are translated into internet protocol (IP) addresses. The DNS enables the translation of IP addresses and domain names by storing accessible records that associate one or more domain names with one or more IP addresses. It maps the name people use to locate a website to the IP address that a computer uses to locate a website.

A malicious code is an file or programs that can cause harm to a computer or compromise data stored on a computer. Examples of a malicious code include a virus, a Trojan Horse, a worm, a botnet and is often distributed over the Internet. There are known ways of protecting a computer against malicious cod. These include analysis of network traffic, inspection of web content, URL scrutiny, or using a combination of those techniques. These approaches, although effective in many cases, are highly manual and time-consuming and could not discover the malicious Domains/IPs at an early stage. For example, there are products that detect, block and/or remove malicious code from devices. Another way of protecting devices against malicious code is to avoid domains with malicious code, spam or botnets. Block lists have been developed that lists of domain names that are known or suspected to resolve to IP addresses that host malicious content or are part of a botnet. A botnet is a set of internet-connected devices, each of which is running one or more bots that can be used to perform distributed denial-of-service attack (DDoS attack), steal data, send spam, and allows the attacker to access the device and its connection). To list a domain on a block list, network operators may access network resources and analyze the content of the resource for the presence of malicious code. If a domain has malicious code the domain name is added to the block list and published for use.

The current approaches to find malicious domains and IPs primarily involve traffic analysis and malware analysis on the domains and IPs, both of these methods can be highly manual and time-consuming. Additionally, these methods only detect the malicious domain and IPs only after the damage has already occurred. Thus, there is a need to predict a malicious domain or IP before an attack occurs. Also, because nefarious individuals are constantly registering new domains or switching to new IPs, there is a need to determine if a brand new domain or IP is malicious.

SUMMARY

One general aspect includes a method for discovering malicious domains and IP addresses (IPs) in a network having a set of domains and a set of IPs. The method includes accessing a domain name system query database, and building a domain and IP resolution graph for the set of domains. The method also includes accessing a malicious domain and malicious IP database. A seed set of known malicious domains and known malicious IPs is selected from the malicious domain and malicious IP database. The method includes generating a graphical probabilistic propagation inference from the domain and IP resolution graph and the seed set of known malicious domains and known malicious IPs. A malicious score is calculated for each domain in the set of domains and each IP in the set of IPs, and the malicious domain and malicious IP database is updated.

Implementations may include one or more of the following features. The method where generating the graphical probabilistic propagation inference includes generating a graphical inference from each domain in the set of domains and each IP in the set of IPs. The method further including creating a set of combined inferences by combining each graphical inference from each domain in the set of domains and each IP in the set of IPs. Implementations further include the method where computing the malicious score for each domain in the set of domains and each IP in the set of IPs includes computing the malicious score from each combined inference in the set of combined inferences. The method where computing the malicious score for each domain in the set of domains and each IP in the set of IPs includes computing the malicious score for each domain in the set of domains and each IP in the set of IPs by layers. The method where computing the malicious score for each domain in the set of domains and the malicious score for each IP in the set of IPs by layers includes computing the malicious score for each domain in the set of domains and the malicious score for each IP in the set of IPs starting from a layer depth value d, where d is equal to zero. The method further including: incrementing d by one; computing the malicious score for each domain in the set of domains and each IP in the set of IPs in a layer depth where d is equal to d plus one to create a set of malicious scores; and if d is less than a threshold value repeating incrementing d by one and computing the malicious score for each domain in the set of domains and each IP in the set of IPs if d is equal to the threshold value, returning the set of malicious scores to the malicious domain and malicious IP database.

One general aspect includes a system for discovering malicious domains and IPs in a network having a set of domains and a set of IPs. The system includes a storage device storing a domain name system query database and a storage device storing a malicious domain and malicious IP database. The system further includes a processor and a non-volatile computer memory for storing computer instruction coupled to the processor, where processor, responsive to executing the computer instructions, performs operations implementing a method. The operations performed by the processor include accessing the domain name system query database and building a domain and IP resolution graph for the set of domains. The operations performed by the processor also include accessing the malicious domain and malicious IP database and selecting a seed set of known malicious domains and known malicious IPs from the malicious domain and malicious IP database. A graphical probabilistic propagation inference from the domain and IP resolution graph and the seed set of known malicious domains and known malicious IPs is generated. A malicious score for each domain in the set of domains and each IP in the set of IPs is calculated and the malicious domain and IP database is updated.

One general aspect includes a non-transitory, tangible computer-readable medium having computer-executable instructions stored thereon which, when executed by a computer, cause the computer to perform a method for discovering malicious domains and IPs in a network having a set of domains and a set of IPs. The method performed includes accessing a domain name system query database and building a domain and IP resolution graph for the set of domains. The method performed by the computer further includes accessing a malicious domain and malicious IP database and selecting a seed set of known malicious domains and known malicious IPs from the malicious domain and malicious IP database. The method performed by the computer further includes generating a graphical probabilistic propagation inference from the domain and IP resolution graph and the seed set of known malicious domains and known malicious IPs and calculating a malicious score for each domain in the set of domains and each IP in the set of IPs. The method performed by the computer further includes updating the malicious domain and IP database.

BRIEF DESCRIPTION OF THE DRAWINGS

FIG. 11 is a flowchart of a method for scoring domains and IPs using domain resolution data to identify malicious domains and IPs.

FIG. 12 is a flowchart of a method for computing malicious scores for domains and IPs.

DETAILED DESCRIPTION OF ILLUSTRATIVE EMBODIMENTS

Glossary

"Graphical model" is a type of probabilistic network that use graphs to represent and manipulate joint probability distributions. A graphical model has both a structural component encoded by the pattern of edges in the graph, and a parametric component encoded by numerical potentials associated with sets of edges in the graph.

"Inference algorithms" allow statistical quantities (such as likelihoods and conditional probabilities) and information-theoretic quantities (such as mutual information and conditional entropies) to be computed efficiently.

Probabilistic inference is the task of deriving the probability of one or more random variables taking a specific value or set of values.

Figure 1:
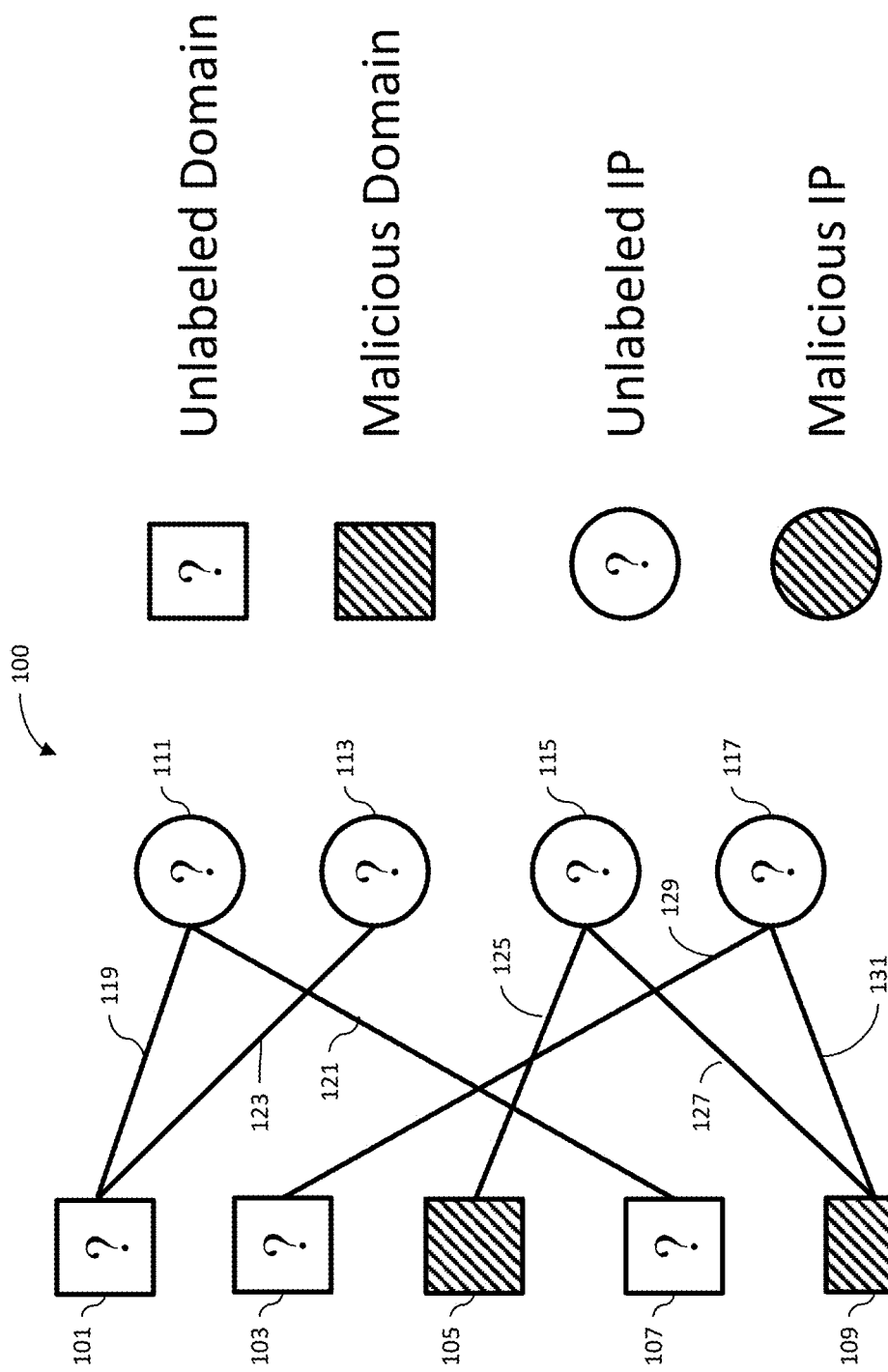
FIG. 1 is a block diagram showing a set of domains and IP addresses.

FIG. 1 is a representation of a DNS resolution graph 100. In DNS resolution data the time, domain and IP address are recorded whenever a request for a domain is resolved to an IP. The DNS resolution graph 100 includes a set of domains such as domain 101, domain 103, domain 105, domain 107 and domain 109. The DNS resolution graph also includes IP 111, IP 113, IP 115, and IP 117. In the example of FIG. 1 domain 105 and domain 109 are identified a malicious, while the remaining domains and IPs are unlabeled.

Figure 2:
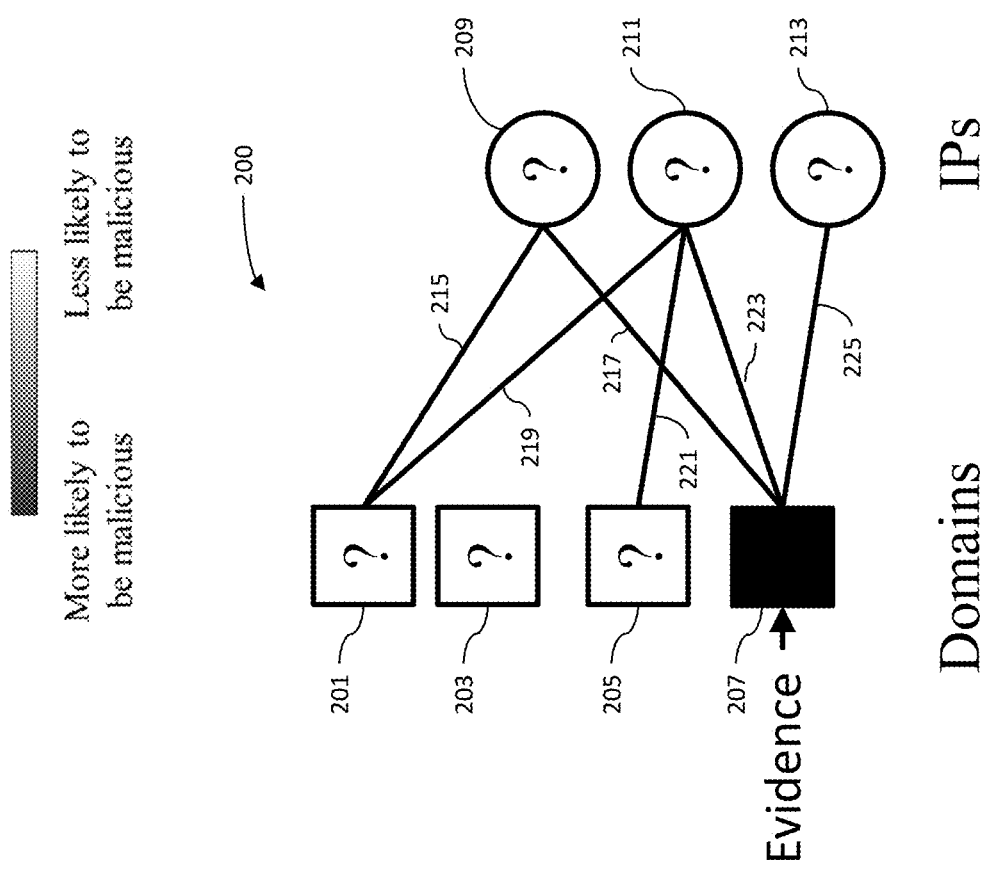
FIG. 2 is a block diagram illustrating a system with a malicious domain.

FIG. 2 is a DNS resolution graph 200 having domains 201, domain 203, domain 205 and domain 207. Domain 207 is illustrated as being malicious while the rest are unlabeled. The DNS resolution graph 200 also includes IP 209, IP 211 and IP 213. IP 209 is connected to domain 201 and domain 207 as illustrated by line 215 and line 217. IP 211 is connected to domain 201, domain 205 and domain 207 as illustrated by line 219, line 221 and line 223. IP 213 is connected to domain 207 as illustrated with line 225.

Figure 3:
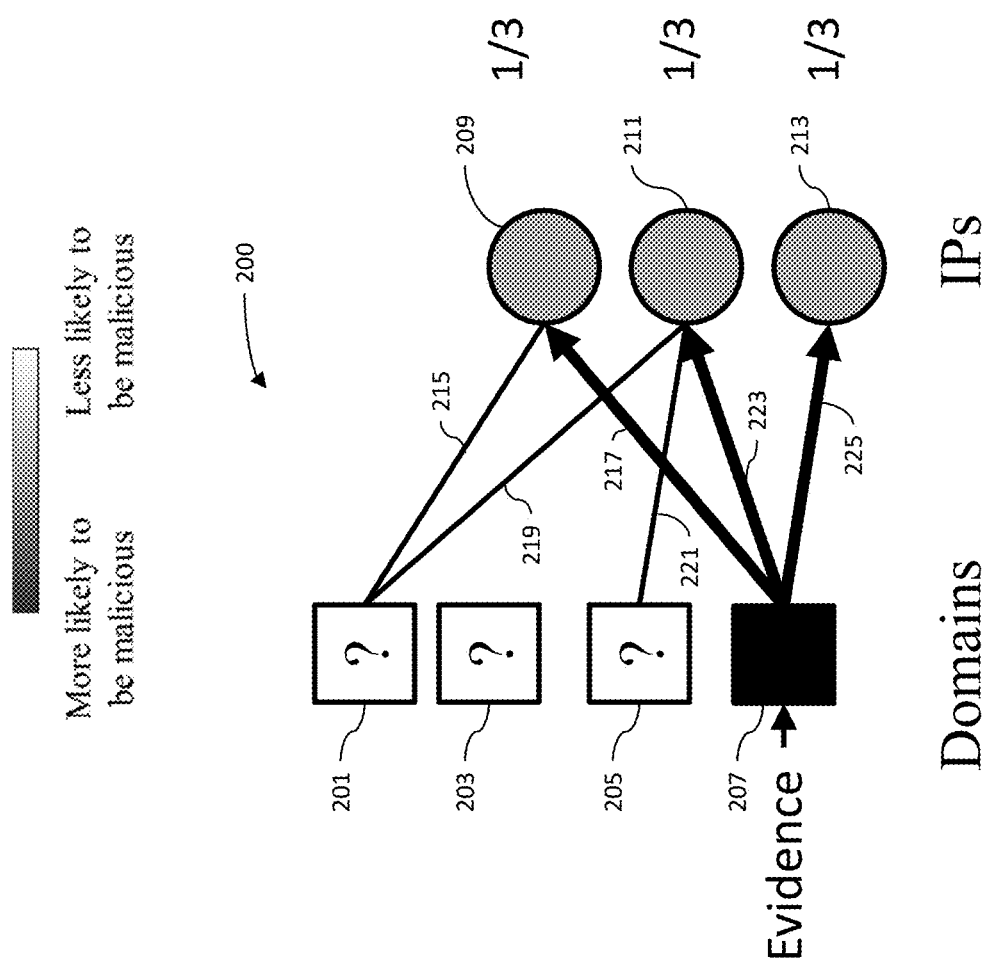
FIG. 3 is a block diagram illustrating a system with a malicious domain and the inferences that can be drawn about the IPs from the malicious domain.

FIG. 3 illustrates the DNS resolution graph showing the IP 209, IP 211 and IP 213 are more likely to be malicious because of their connection to known malicious domain 207. The probability of each IP being malicious is given as ⅓ as an example. For a pair of domains and IPs (v,u) the probability of their being malicious is quantified by the propagation function $$\phi(v,u).$$

Figure 4:
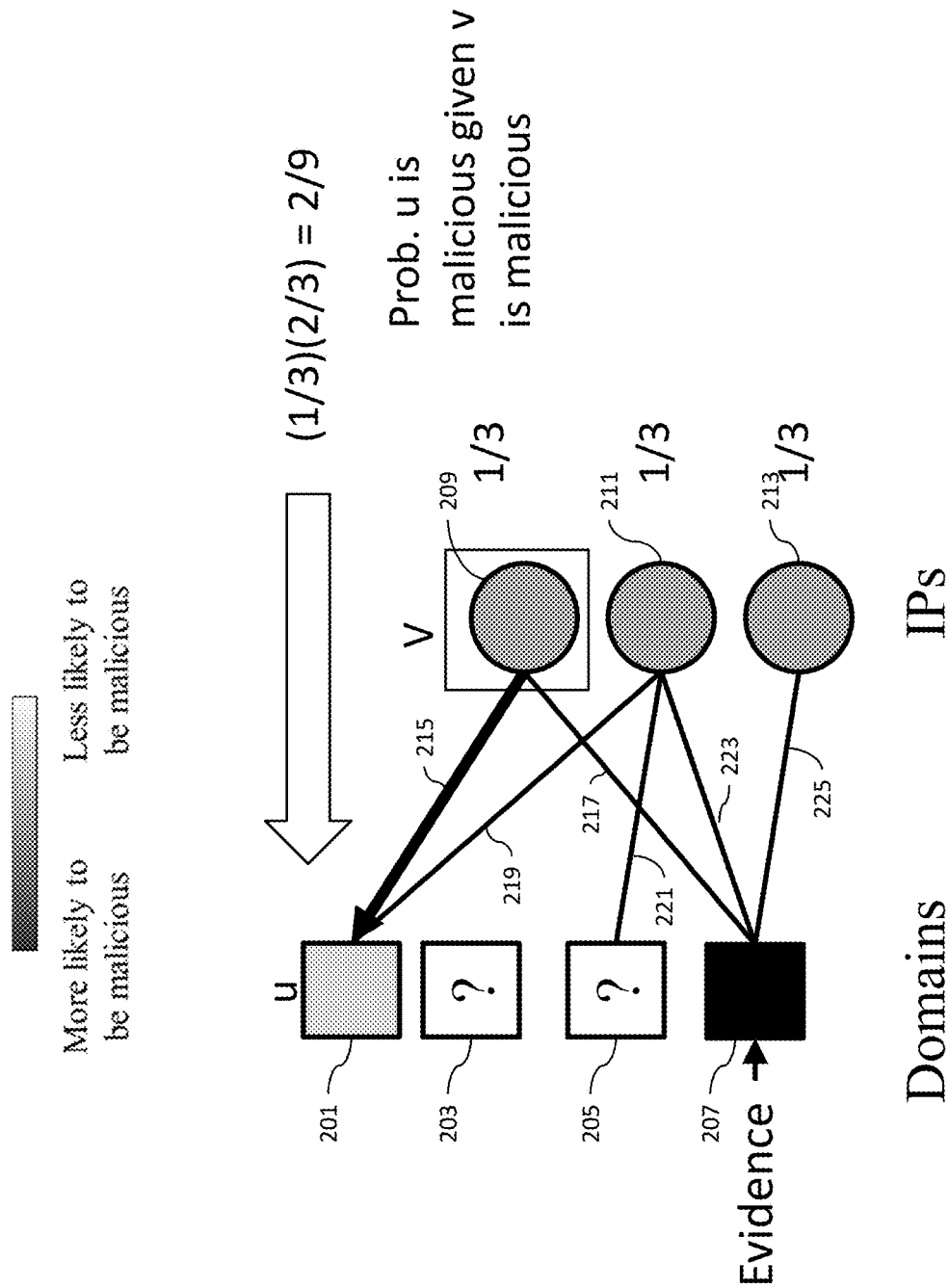
FIG. 4 is a block diagram illustrating the inference about a domain that can be drawn from probably malicious IPs.
Figure 5:
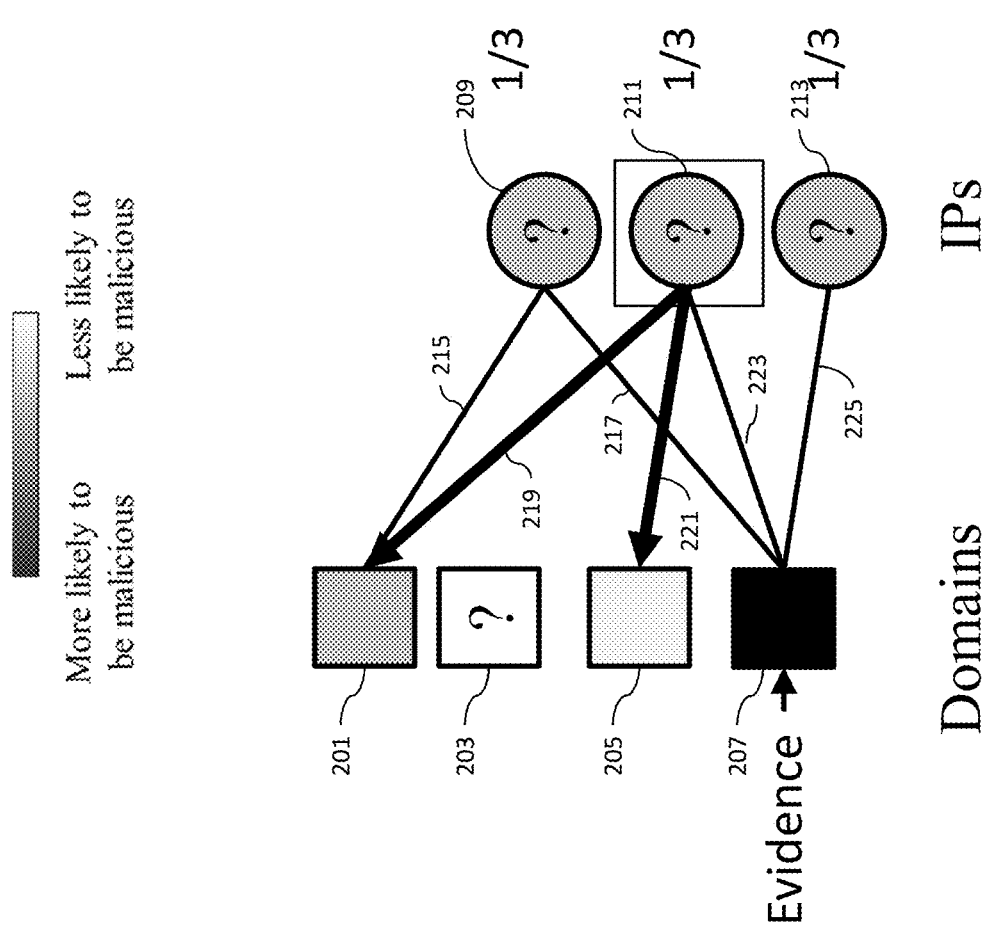
FIG. 5 is a block diagram illustrating the further inference about domains that can be drawn from probably malicious IPs.

FIG. 4 illustrates the methodology for determining if domain 201 is malicious. The probability that domain 201 is malicious given if IP 209 and IP 211 are malicious may be ⅔ (⅓ each). So, the probability that domain 201 is malicious would be the probability that IP 209 is malicious (⅓) times the probability that domain 201 is malicious if both IP 209 and IP 211 are malicious ((⅓)(⅔)=2/9). FIG. 5 illustrates that the probability that domain 201 is malicious given that domain 207 is malicious due to connection 219.

FIG. 5 illustrates the probability that domain 205 which is connected only with IP 211 would be ⅑.

Figure 6:
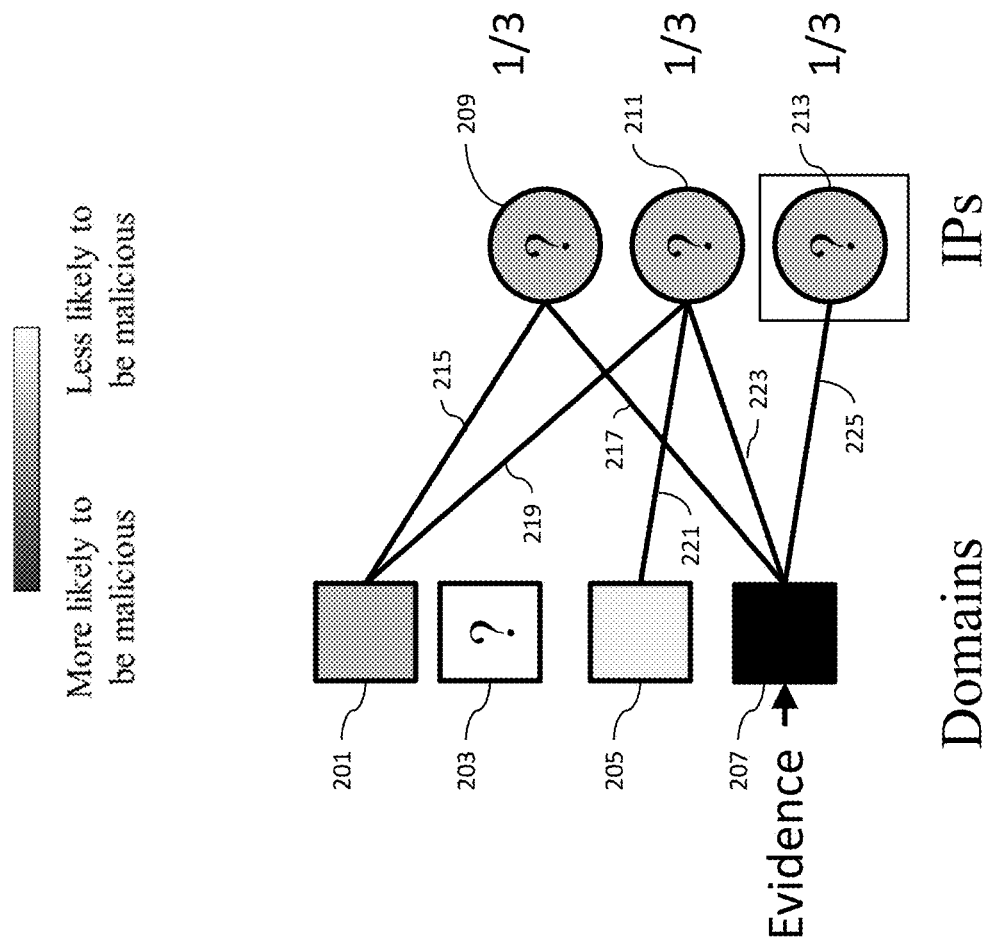
FIG. 6 is a block diagram illustrating the further inference about domains that can be drawn from probably malicious IPs and domains.

FIG. 6 illustrates that no further inference can be drawn from IP 213 that is connected only to domain 207 that is the known malicious domain.

Figure 7:
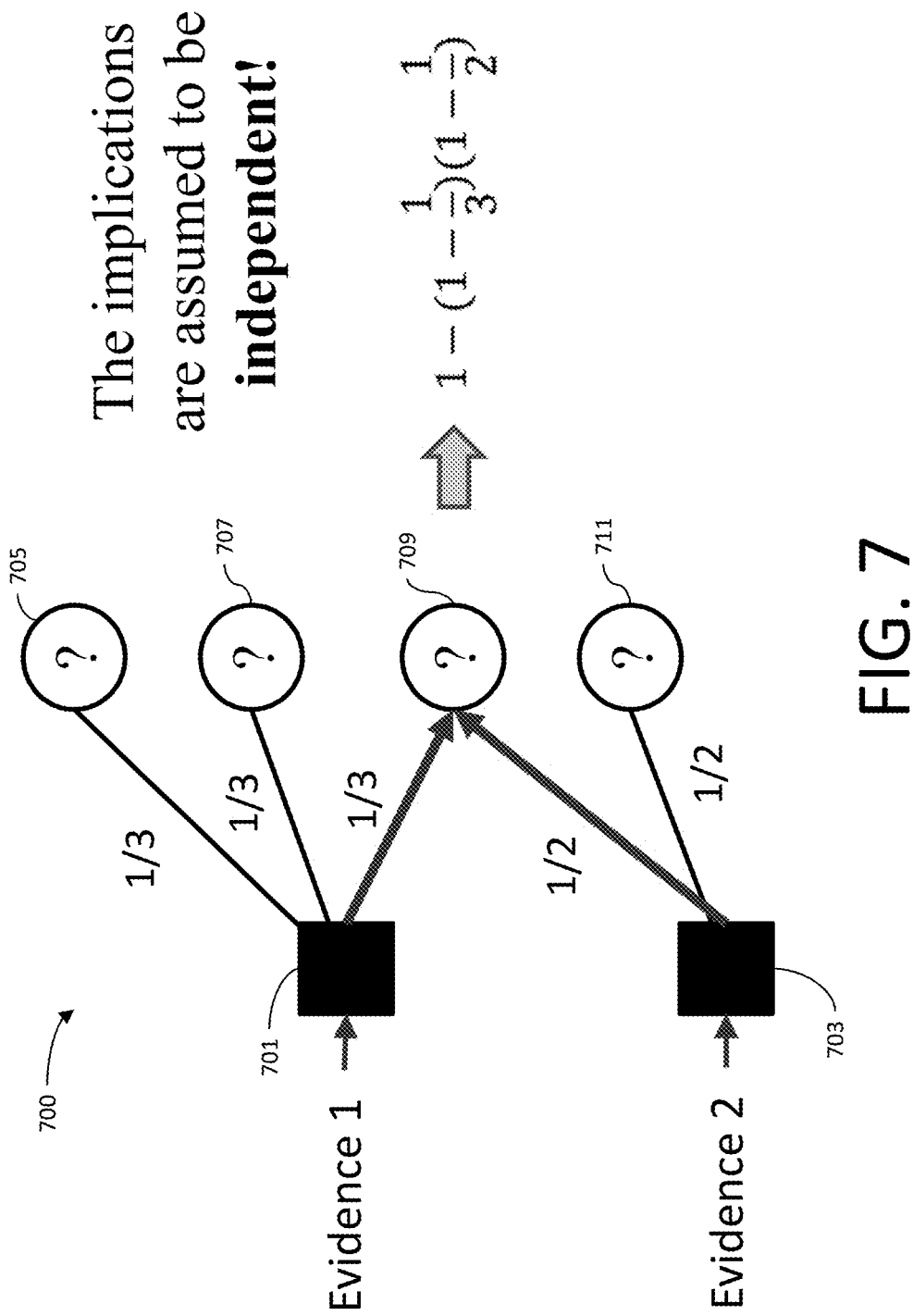
FIG. 7 is a block diagram illustrating the probability that an IP is malicious if two malicious domains are connected to the IP.

FIG. 7 illustrates an example of a DNS resolution graph 700 having a malicious domain 701 and a malicious domain 703. Malicious domain 701 is connected to three IPs, IP 705, IP 707, IP 709 and IP 711. Malicious domain 703 is connected to two IPs, IP 709 and IP 711. The probability that IP 709 is malicious can be calculated as 1−(1−⅓)(1−½). The implications are assumed to be independent.

Figure 8:
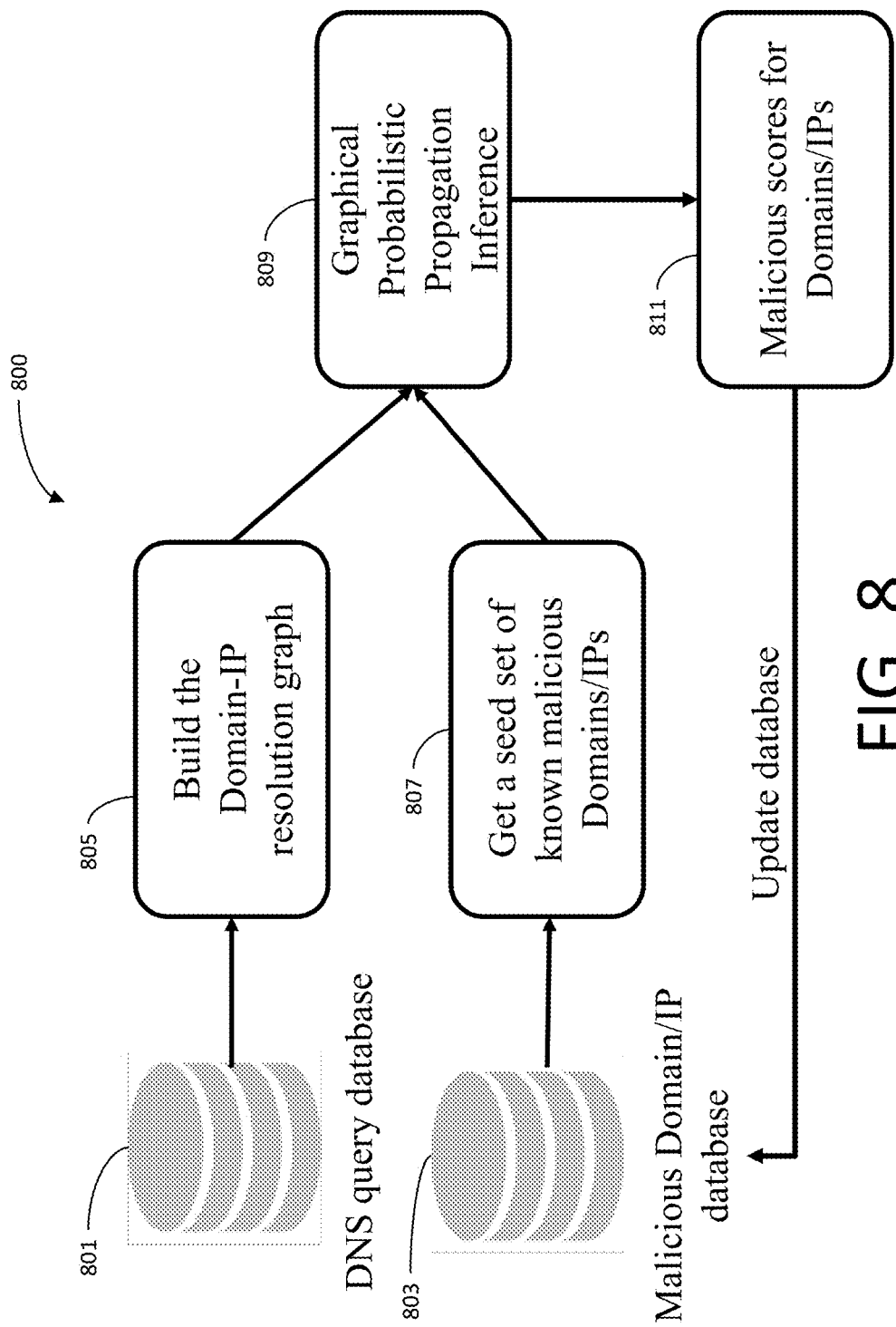
FIG. 8 is a block diagram of a system for scoring domains and IPs using domain resolution data to identify malicious domains and IPs.

Illustrated in FIG. 8 is a diagram displaying a system 800 for scoring domains and IPs using domain resolution data to identify malicious domains and IPs in a network.

The system 800 includes a DNS query database 801 and a malicious domain and IP database 803.

The system 800 includes a resolution graph module 805 that is responsible for building a Domain/IP resolution graph. The resolution graph module 805 accesses the DNS query database to get the domain-IP resolution history, i.e., which set of domains are resolved to which set of IPs, for a given period of time, e.g., one day. Then the resolution graph module 805 constructs a bipartite graph G(V,E) as follows. We use V to denote the set of Domains/IPs and E to denote the set of edges, where an edge exists between a Domain and an IP if the Domain had been resolved to the IP in the given period of time.

The system 800 also includes a seeding module 807 that selects a seed set of known malicious domains/IPs.

The system 800 includes an inference module 809 that provides a graphical probabilistic propagation inference based on the input from the resolution graph module 805 and the seeding module 807 and is responsible for assigning malicious scores to the Domains/IPs.

The output of the inference module 809 is provided to malicious score module 811 which feeds that output to the malicious Domain/IP database 803 which would be updated accordingly.

Figure 9:
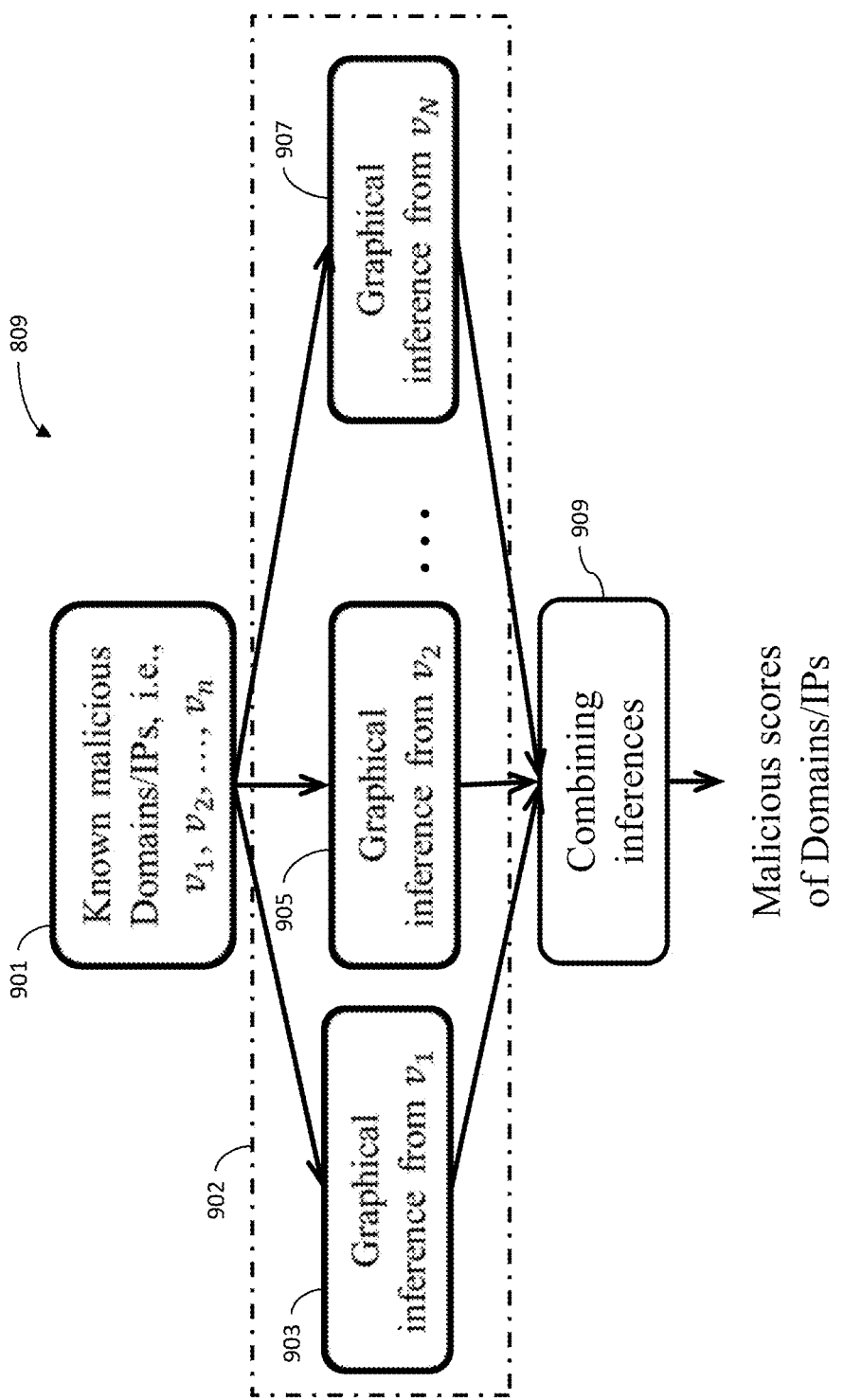
FIG. 9 is a block diagram of components of an inference module.

FIG. 9 illustrates the components of the inference module 809 for conducting the graphical probabilistic propagation inference. The inference module 809 consist of three components. The first component is the malicious domain/IPs assignment component 901. The component is the graphical inference component 902. Graphical inference component 902 includes a plurality of graphical interference members for example, graphical inference member 903 that provides a graphical inference from $v_1$, graphical inference member 905 that provides a graphical inference from $v_2$, and graphical inference member 907 that provides a graphical inference from $v_n$. The third component is the score computation component 909. The malicious domain/IP assignment component 901 takes as inputs from the outputs of resolution graph module 805 and seeding module 807 and assigns different known malicious Domains/IPs to different members of the graphical inference component 902. Each member of the graphical inference component 902 takes one known malicious Domain/IP as input and computes the malicious scores for other Domains/IPs based on the Domain-IP resolution graph. Note that different known malicious Domains/IPs are assigned to different graphical inference component 902 members and the members could work independently. The score computation component 909 takes the malicious scores from each member of the graphical inference component 902 as input, combines the malicious scores and computes a final score for each domain/IP.

Figure 10:
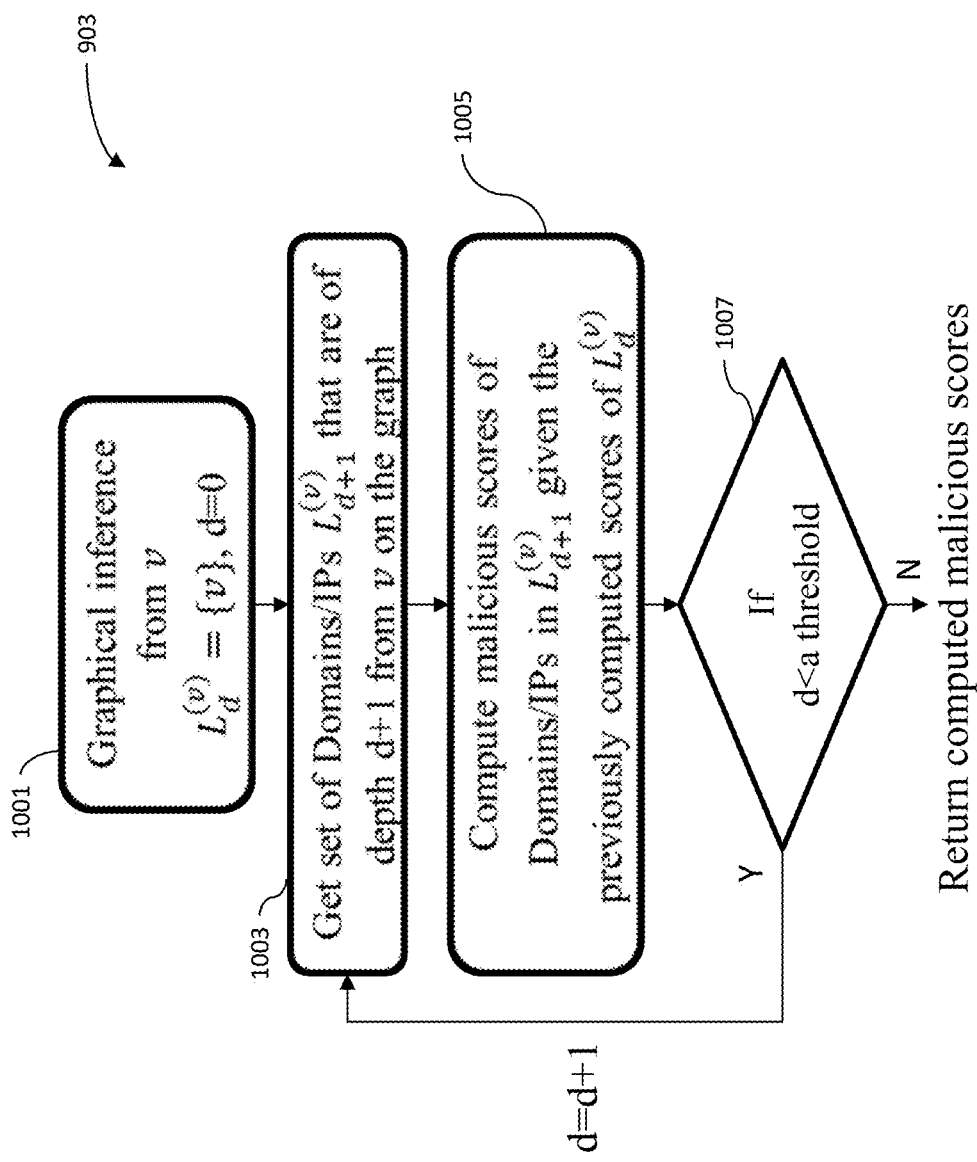
FIG. 10 is a block diagram the elements of the members of the graphical inference component of the inference module.

FIG. 10 illustrates the elements of the members of the graphical inference component 902. Each member of the graphical inference component 902 (say graphical inference member 903) comprises three elements. Element 1001 takes one known malicious Domain/IP as input and computes the malicious scores for other Domains/IPs based on the Domain-IP resolution graph. Element 1003 initializes the graphical inference from a known malicious Domain/IP v. $L_d^{(v)}$ denotes the set of Domains/IPs that has of depth d starting from v. Initially, d=0 and $L_d^{(v)}=\{v\}$. Element 1005 takes the output of the element 1003, and computes malicious scores of domain/IPs in $L_{d+1}^{(v)}$ given the previously computed scores of $L_d^{(v)}$. Conditional element 2007 decides the termination of the computation loop. If d is less than some threshold, d will be incremented by 1 and element 1003 and element 1005 will be processed again. Otherwise the computed malicious scores will be returned as the output of graphical inference component 902.

An embodiment of a concrete implementation of graphical inference component 902 is included below. A bipartite graph G(V,E) is defined as follows. V to denotes the set of Domains/IPs and E denotes the set of edges, where an edge exists between a Domain and an IP if the Domain had been resolved to the IP in the given period of time. We use $S_{seed}$ to denote the seed set of Domains/IPs that are known malicious. $\{\tau_v\}_{v \in V}$ represent the initial malicious scores of domain/IP before a graphical inference is made. A Propagation/Link function for a pair of Domains/IPs u,v as the probability that u is malicious because of v, given that v is malicious.

$$\phi(v,u) \triangleq P(u \text{ is malicious because of } v | v \text{ is malicious})$$

Finally, the final malicious scores of the Domains/IPs are denoted as $$\Gamma \triangleq \{\gamma_v\} v \in v$$

The graphical inference method which corresponds to graphical inference component 902 may be described as follows.

---

Algorithm 1 - Probabilistic Propagation Algorithm.

---

Input: Domain-IP Graph G(v, ε), prior probabilities $\{\tau_v\} v \in v$, and propagation function $\phi(v, u)$, f or v, u ∈ v.

Output: Probabilistic scores $\Gamma \triangleq \{\gamma_v\} v \in v$.

1: Initialization: $\Lambda^v = \{\cdot\}$ for $\forall v \in v$
   (where $\Lambda^v$ is denotes the set of probabilities that a domain/IP v is malicious because of another domain/IP. $\{\cdot\}$ means that initially, it is set to be an empty set for all domain/IP v.)
2: - - - - - - - - Iterate through evidences - - - - - - -
3: for all v ∈ v such that $\tau_v$ > 0 do
4: Construct a tree rooted at v with layers of nodes as $\{L_0^{(v)} = \{v\}, \ldots, L_k^{(v)}\}$.
   (Where $L_d^{(v)}$ denotes the set of Domains/IPs that has of depth d starting from v. Initially, d = 0 and $L_d^{(v)}=\{v\}$. In other words, starting from the node v that is focused on, the nodes may be sorted as follows. v is considered as a root node of depth 0; the nodes that have an edge with v are considered to be of depth 1; the nodes that have an edge to the nodes of depth 1 are of depth 2; and so on.)
5: $S^{(v,v)} = \{\tau_v\}$ and $S^{(v,u)} = \emptyset$ for $\forall u \in v$.
   (Where $S^{(v,u)}$ denote the set of probabilities that u being malicious because of the nodes in the last layer of the tree rooted at v)
6: for l = 0, 1, . . . . . , k do
7: for all u ∈ $L_l^{(v)}$ do
8: if $S^{(v,u)} \neq \emptyset$ then
9: - - Calculate inference from v to u - - -
10: $\Lambda^{(u)}[v] = 1 - \Pi_{\delta \in S^{(v,u)}}(1 - \delta)$.
   (Where $\Lambda^{(u)}[v]$ denotes the probability that u is malicious because of v, calculated as follows. As stated previously, $S^{(v,u)}$ denotes the set of probabilities that u being malicious because of the nodes in the last layer of the tree rooted at v. Here under the independence assumption, $\Lambda^{(u)}[v]$ is calculated from $S^{(v,u)}$. Specifically, Π stands for multiplication. (1 – δ) is multiplied for any number δ in $S^{(v,u)}$. For example, say $S^{(v,u)}$ is a set of two probabilities, e.g., 0.2, 0.3. Then $\Lambda^{(u)}[v]$ is computed as 1– (1-0.2)*(1-0.3)=0.44. δ just means any number in the set $S^{(v,u)}$.)
11: - - Probabilities propagate along graph -
12: for all w ∈ N(u)∩$L_{l+1}^v$ do
   (N(u) denotes the set of neighbors of a domain/IP u. ∩ denotes the intersection of two sets. Here we use N(u)∩$L_{l+1}^{(v)}$ to denote the nodes that are (1) a neighbor of u; and (2) of a depth l + 1 starting from v.
13: $S^{(v,w)} = S^{(v,w)} \cup \{\Lambda^{(u)}[v] \cdot \phi(u,w)\}$
14: - - - - - - - - - Combining all the evidences - - - - -
15: for all v ∈ v do
16: $\gamma_v = 1 - \Pi_{u \in \Lambda^{(v)}}(1 - \Lambda^v[u])$.

-continued

Algorithm 1 - Probabilistic Propagation Algorithm.

(Where $\gamma_v$ denotes the final malicious score of a domain/IP v. After we compute $\Lambda^{(v)}$ which denotes the set of probabilities that a domain/IP v is malicious because of another domain/IP, we could finally compute $\gamma_v$. This step is very similar to line 10. For example, $\Lambda^{(v)}$ is a set of three numbers 0.1,0.2,0.3. Then $\gamma_v$ is calculated as 1−(1−0.1)*(1−0.2)*(1−0.3). Finally, final malicious scores of the Domains/IPs are denoted as $\Gamma \triangleq \{\gamma_v\} v \in v$.
17.  return $\Gamma = \{\gamma_v\} v \in v$ Specifically, lines 1-3 correspond to the malicious domain/IP assignment component 901, lines 4-13 correspond to the graphical inference component 902, and lines 14-16 correspond to the score computation component 909.

Illustrated in FIG. 11 is a flowchart of a method 1100 for scoring domains and IPs using domain resolution data to identify malicious domains and IPs.

In step 1101 the method 1100 accesses a DNS query database and extracts information necessary to build a domain/IP resolution graph for a domain set.

In step 1103, the method 1100 builds a domain/IP resolution graph.

In step 1105, the method 1100 accesses a malicious domain/IP database that contains a listing of malicious domains and IPs.

In step 1107, the method 1100 selects a seed set of malicious domains/IPs In step 1109, the method 1100 generates graphical probabilistic inferences for the domains/IPs.

In step 1111, the method 1100 calculates a malicious score for each domain/IP.

In step 1113, the method 1100 updates the malicious domain/IP database with a listing of newly identified malicious domains/IPs.

Illustrated in FIG. 12 is a method 1200 for computing malicious scores for domains and IPs.

In step 1201 the method 1200 assigns different known malicious domains/IPs.

In step 1203, the method 1200 computes the malicious scores for other domains/IPs.

In step 1205, the method 1200 combines the malicious scores.

In step 1207, the method 1200 computes the final malicious score for each domain/IP.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a non-transitory computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" is used herein to mean serving as an instance or illustration. Any embodiment or design described herein as an "example" is not necessarily to be construed as preferred or advantageous over other embodiments or designs. Rather, use of the word example is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed:

1. A method for discovering malicious domains and IP addresses (IPs) in a network having a set of domains and a set of IPs comprising:
    accessing a domain name system query database;
    building a domain and IP resolution graph for the set of domains based on the accessing of the domain name system query database;
    accessing a malicious domain and malicious IP database;
    selecting a seed set of known malicious domains and known malicious IPs from the malicious domain and malicious IP database based on the accessing of the malicious domain and malicious IP database;
    generating a graphical probabilistic propagation inference from the domain and IP resolution graph and the seed set of known malicious domains and known malicious IPs, wherein the generating of the graphical probabilistic propagation inference is based on applying a respective known malicious domain and malicious IP of the seed set to each member of a plurality of members of a graphical inference component, and wherein each member computes in parallel and independently malicious scores for other domains and IPs based on the domain and IP resolution graph;
    calculating a malicious score for each domain in the set of domains and each IP in the set of IPs based on the malicious scores computed by the members; and
    updating the malicious domain and malicious IP database based on the calculating of the malicious score.

2. The method of claim 1 wherein generating the graphical probabilistic propagation inference comprises generating a graphical inference from each domain in the set of domains and each IP in the set of IPs.

3. The method of claim 2 further comprising creating a set of combined inferences by combining each graphical inference from each domain in the set of domains and each IP in the set of IPs.

4. The method of claim 3 wherein computing the malicious score for each domain in the set of domains and each IP in the set of IPs comprises computing the malicious score from each combined inference in the set of combined inferences.

5. The method of claim 4 wherein computing the malicious score for each domain in the set of domains and each IP in the set of IPs comprises computing the malicious score for each domain in the set of domains and each IP in the set of IPs by layers.

6. The method of claim 5 wherein computing the malicious score for each domain in the set of domains and the malicious score for each IP in the set of IPs by layers comprises computing the malicious score for each domain in the set of domains and the malicious score for each IP in the set of IPs starting from a layer depth value d, where d is equal to zero.

7. The method of claim 6 further comprising:
incrementing d by one;
computing the malicious score for each domain in the set of domains and each IP in the set of IPs in a layer depth where d is equal to d plus one to create a set of malicious scores; and
if d is less than a threshold value repeating incrementing d by one and computing the malicious score for each domain in the set of domains and each IP in the set of IPs
if d is equal to the threshold value, returning the set of malicious scores to the malicious domain and malicious IP database.

8. A system for discovering malicious domains and IP addresses (IPs) in a network having a set of domains and a set of IPs comprising:
a storage device storing a domain name system query database;
a storage device storing a malicious domain and malicious IP database;
a processor;
a non-volatile computer memory for storing computer instructions coupled to the processor, wherein the processor, responsive to executing the computer instructions, performs operations comprising:
accessing the domain name system query database;
building a domain and IP resolution graph for the set of domains based on the accessing of the domain name system query database;
accessing the malicious domain and malicious IP database;
selecting a seed set of known malicious domains and known malicious IPs from the malicious domain and malicious IP database based on the accessing of the malicious domain and malicious IP database;
generating a graphical probabilistic propagation inference from the domain and IP resolution graph and the seed set of known malicious domains and known malicious IPs, wherein the generating of the graphical probabilistic propagation inference is based on applying a respective known malicious domain and malicious IP of the seed set to each member of a plurality of members of a graphical inference component, and wherein each member computes in parallel and independently malicious scores for other domains and IPs based on the domain and IP resolution graph;
calculating a malicious score for each domain in the set of domains and each IP in the set of IPs based on the malicious scores computed by the members; and
updating the malicious domain and malicious IP database based on the calculating of the malicious score.

9. The system of claim 8 wherein generating the graphical probabilistic propagation inference performed by the processor comprises generating a graphical inference from each domain in the set of domains and each IP in the set of IPs.

10. The system of claim 9 wherein the operations performed by the processor further comprise creating a set of combined inferences by combining each graphical inference from each domain in the set of domains and each IP in the set of IPs.

11. The system of claim 10 wherein computing the malicious score for each domain in the set of domains and each IP in the set of IPs performed by the processor comprises computing the malicious score from each combined inference in the set of combined inferences.

12. The system of claim 11 wherein computing the malicious score for each domain in the set of domains and each IP in the set of IPs performed by the processor comprises computing the malicious score for each domain in the set of domains and each IP in the set of IPs by layers.

13. The system of claim 12 wherein computing the malicious score for each domain in the set of domains and the malicious score for each IP in the set of IPs by layers performed by the processor comprises computing the malicious score for each domain in the set of domains and the malicious score for each IP in the set of IPs starting from a layer depth value d, where d is equal to zero.

14. The system of claim 13 wherein the operations performed by the processor further comprise
incrementing d by one;
computing the malicious score for each domain in the set of domains and each IP in the set of IPs in a layer depth where d is equal to d plus one to create a set of malicious scores; and
if d is less than a threshold value repeating incrementing d by one and computing the malicious score for each domain in the set of domains and each IP in the set of IPs
if d is equal to the threshold value, returning the set of malicious scores to the malicious domain and malicious IP database.

15. A non-transitory, tangible computer-readable medium having computer-executable instructions stored thereon which, when executed by a computer, cause the computer to perform a method for discovering malicious domains and IP addresses (IPs) in a network having a set of domains and a set of IPs comprising:
accessing a domain name system query database;
building a domain and IP resolution graph for the set of domains based on the accessing of the domain name system query database;
accessing a malicious domain and malicious IP database;
selecting a seed set of known malicious domains and known malicious IPs from the malicious domain and malicious IP database based on the accessing of the malicious domain and malicious IP database;
generating a graphical probabilistic propagation inference from the domain and IP resolution graph and the seed set of known malicious domains and known malicious IPs, wherein the generating of the graphical probabilistic propagation inference is based on applying a respective known malicious domain and malicious IP of the seed set to each member of a plurality of members of a graphical inference component, and wherein each member computes in parallel and independently malicious scores for other domains and IPs based on the domain and IP resolution graph;
calculating a malicious score for each domain in the set of domains and each IP in the set of IPs based on malicious scores computed by the members; and
updating the malicious domain and malicious IP database based on the calculating of the malicious score.

16. The non-transitory, tangible computer-readable medium of claim 15 wherein generating the graphical probabilistic propagation inference comprises generating a graphical inference from each domain in the set of domains and each IP in the set of IPs.

17. The non-transitory, tangible computer-readable medium of claim 16 wherein the method performed by the computer further comprises creating a set of combined inferences by combining each graphical inference from each domain in the set of domains and each IP in the set of IPs.

18. The non-transitory, tangible computer-readable medium of claim 17 wherein computing the malicious score for each domain in the set of domains and each IP in the set of IPs comprises computing the malicious score from each combined inference from the set of combined inferences.

19. The non-transitory, tangible computer-readable medium of claim 18 wherein computing the malicious score for each domain in the set of domains and each IP in the set of IPs comprises computing the malicious score for each domain in the set of domains and each IP in the set of IPs by layers.

20. The non-transitory, tangible computer-readable medium of claim 19 wherein computing the malicious score for each domain in the set of domains and the malicious score for each IP in the set of IPs by layers comprises:
   computing the malicious score for each domain in the set of domains and the malicious score for each IP in the set of IPs starting from a layer depth value d, where d is equal to zero to create a set of malicious scores;
   incrementing d by one;
   computing the malicious score for each domain in the set of domains and each IP in the set of IPs in a layer depth where d is equal to d plus one; and
   if d is less than a threshold value repeating incrementing d by one and computing the malicious score for each domain in the set of domains and each IP in the set of IPs
   if d is equal to the threshold value, returning the set of malicious scores to the malicious domain and malicious IP database.

* * * * *